(12) United States Patent
Iyer

(10) Patent No.: US 11,101,485 B2
(45) Date of Patent: Aug. 24, 2021

(54) FLOW BATTERY

(71) Applicant: NRGTEK, Inc., Orange, CA (US)

(72) Inventor: Subramanian Iyer, Orange, CA (US)

(73) Assignee: NRGTEK, Inc., Orange, CA (US)

( * ) Notice: Subject to any disclaimer, the term of this patent is extended or adjusted under 35 U.S.C. 154(b) by 174 days.

(21) Appl. No.: 16/684,910

(22) Filed: Nov. 15, 2019

(65) Prior Publication Data

US 2020/0176801 A1 Jun. 4, 2020

Related U.S. Application Data

(60) Provisional application No. 62/778,439, filed on Dec. 12, 2018, provisional application No. 62/774,059, filed on Nov. 30, 2018.

(51) Int. Cl.
*H01M 8/18* (2006.01)
*H01M 4/90* (2006.01)
*H01M 4/94* (2006.01)

(52) U.S. Cl.
CPC ......... *H01M 8/188* (2013.01); *H01M 4/9041* (2013.01); *H01M 4/94* (2013.01); *H01M 2300/0011* (2013.01); *H01M 2300/0022* (2013.01)

(58) Field of Classification Search
CPC ...... H01M 8/188; H01M 4/9041; H01M 4/94; H01M 2300/0022; H01M 2300/0011
See application file for complete search history.

(56) References Cited

U.S. PATENT DOCUMENTS

| | | | | |
|---|---|---|---|---|
| 10,586,997 B1 * | 3/2020 | Ingersoll | ............... | C07C 229/16 |
| 2018/0241107 A1 * | 8/2018 | Su | ......................... | H01M 12/08 |
| 2018/0261871 A1 * | 9/2018 | Sakata | ................. | H01M 8/188 |

* cited by examiner

*Primary Examiner* — Stewart A Fraser
(74) *Attorney, Agent, or Firm* — UltimatEdge IP Law Group, P.C.; Dean G. Stathakis; Vito A. Canuso, III

(57) ABSTRACT

A flow battery that includes an electrode and a catholyte including a sulfate solution where, during charge of the flow battery, the sulfate solution becomes a persulfate solution, and during discharge of the flow battery, the persulfate solution becomes a sulfate solution. The electrode may be an anolyte, or it may be an amorphous metal electrode.

14 Claims, 2 Drawing Sheets

FLOW BATTERY

CORRESPONDING PATENT APPLICATIONS

The present application is a non-provisional application claiming priority to U.S. Provisional Application Ser. No. 62/778,439 filed Dec. 12, 2018 and U.S. Provisional Application Ser. No. 62/774,059 filed Nov. 30, 2018, the entire contents of both of which are incorporated herein by reference.

BACKGROUND

Intermittent and variable renewable energy sources (solar and wind) are being used and developed to reduce dependence on fossil fuels, as well as to mitigate global warming and pollution. The intermittency of these energy sources forces grid managers to depend on traditional energy sources for "baseload" generation (coal, natural gas and others). Some are struggling to balance their renewable energy production (from solar and wind, respectively) with grid balancing. In some cases, excess solar power production is either curtailed or sent to neighboring grids. Cost effective storage of gigawatt-hours and megawatt-hours (GWh and MWh) of renewable energy is a much needed technology for integration of clean/green energy into the power grid. In addition, long-duration energy storage (10-100 hrs) at a cost lower than $0.05/kWh-cycle (DOE goals/targets) can also be used very effectively for energy arbitrages and grid-level load management for power from conventional energy sources.

Currently available batteries, including lithium-ion batteries (>$300/kWh), are not yet cost-effective for integration into the electricity grid; in addition, inadequate storage capacity, lack of rapid charge/discharge capability and limited cycle life leave these batteries unsuitable for grid scale energy storage. There is an urgent need for long-duration electricity storage (LDES) technologies with discharge durations that range from 10 to approximately 100 hours at rated power. Such "long" durations energy storage applications have traditionally been cost-prohibitive, and are beyond the requirements for intra-day ("daily") energy time shift and many other stationary electricity storage applications common on the grid today. The energy industry believes durations at rated power of 10 to 100 hours are relevant for needs that go beyond daily cycling but are short of seasonal energy time-shift applications. Long-duration storage applications present new forms of technical challenges associated with exceptionally low lifetime cost requirements (including both capital and operating expenses), particularly for the energy storage media and related components. The target is a levelized cost of storage (LCOS) of 5 cents/kWh-cycle across the full range of storage durations (i.e. 10 to approximately 100 hours), which would result in a target lifetime cost that decreases with increasing storage duration, a marked divergence from many existing storage cost targets that focus on a single duration and thus a single cost metric. The LCOS target of 5 cents/kWh-cycle requires a system round-trip efficiency >50% (RTE).

Redox flow batteries, and to a lesser extent hybrid flow batteries, have the advantages of flexible layout (due to separation of the power and energy components), long cycle life (because there are no solid-to-solid phase transitions), quick response times, no need for "equalization" charging (the overcharging of a battery to ensure all cells have an equal charge) and no harmful emissions. Some types also offer easy state-of-charge determination (through voltage dependence on charge), low maintenance and tolerance to overcharge/overdischarge. Compared to solid-state rechargeable batteries such as Li ion, redox flow batteries can operate at much higher current and power densities. These technical merits make redox flow batteries a well-suited option for large-scale energy storage. An example of a flow battery is shown in U.S. Pat. No. 9,269,983 to Lipka et al.

A similar battery system can also be constructed for using lithium as the electro-active anode. Commercial lithium-ion batteries use lithium ions intercalated in a graphitic anode, while the cathode is constructed from lithiated cobalt oxide ($LiCoO_2$), which has a layered structure. During charging, the lithium ion from the lithiated cobalt oxide is driven into the graphitic anode, resulting in an intercalation compound of lithiated graphite ($C_6Li$). The lithium at both electrodes exists in an ionic form, hence the term Li-ion battery.

The capacity of the graphitic anode is about 372 mAh/gm, while the capacity of the cathode material is around 170 mAh/gm, leading to a severe mismatch between the two electrodes. Several other cathodic materials have been investigated over the last couple of decades, ranging from nickel oxides, manganese oxides, polysulfides and iron phosphates and combinations thereof, but with only incremental improvements in cathode capacity.

Several attempts have also been made to increase the capacity of the anode. Metallic lithium has been investigated, but extreme safety issues have prevented its adoption in rechargeable batteries. In addition, during the charging process, dendrite formation from lithium deposition can cause cell short circuits and fire hazards.

Lithium forms a series of alloys and intermetallic compounds with several elements and metals, like Silicon (Si), Tin (Sn), Aluminum (Al) etc. These and other elements have been investigated for use as lithium anodes. The main goal has been a low electrode potential (<0.35 V) vs $Li^+/Li$, high capacity and structural integrity. Silicon has a theoretical lithium capacity of around 3,000 mAh/gm. Optimally, each silicon atom can bond to 3.75 lithium atoms ($Li_{22}Si_5$), unlike one lithium ion to 6 carbon atoms in graphite, $C_6Li$, leading to the high capacity. However, the act of lithiation and de-lithiation leads to severe volumetric changes in the microstructure of around 300%, leading to anode degradation and pulverization under repeated cycling.

Other alloys explored include tin and aluminum, but similar problems have been observed in all of them, effectively preventing higher-capacity metallic or alloy anodes for a rechargeable lithium battery, as shown in Table 1 below. The capacity limitation of the layered oxide cathode is still unresolved.

TABLE 1

Lithiation/delithiation characteristics of different electrode materials

| Metal | Lithium | Silicon | Aluminum | Germanium | Tin | Aluminum | Graphite |
|---|---|---|---|---|---|---|---|
| Lithiated compound | Li | $Li_{22}Si_5$ | $Al_4Li_9$ | $Li_{22}Ge_5$ | $Li_{22}Sn_5$ | AlLi | $LiC_5$ |
| Theoretical capacity (mAh/g) | >3,800 | >3,000 | 2,234 | 1,600 | 994 | 993 | 372 |
| Volume change (%) | Dendrites | 323 | — | 370 | 300 | 97 | 9 |

SUMMARY OF EMBODIMENTS

In some embodiments, a flow battery is provided comprising an electrode, and a catholyte, where the catholyte comprises a sulfate solution whereby, during charge of the flow battery, the sulfate solution becomes a persulfate solution, and during discharge of the flow battery, the persulfate solution becomes a sulfate solution. In some embodiments, the electrode comprises an anolyte. In some embodiments, the anolyte comprises ferric sulfate. In some embodiments, the catholyte comprises sodium sulfate. In some embodiments, the flow battery further comprises a sulfate ion-exchange membrane separating the anolyte from the catholyte, whereby (a) during system charge the anolyte becomes ferrous sulfate and the catholyte becomes sodium persulfate, and (b) during system discharge the anolyte goes back to ferric sulfate and the catholyte goes back to sodium sulfate.

In other embodiments of the flow battery, the electrode may comprise amorphous metal, such as for example amorphous silicon or amorphous tin. In some embodiments, the catholyte comprises lithium sulfate, whereby (a) during system charge the catholyte becomes lithium persulfate and lithium is deposited within the electrode, and (b) during system discharge the lithium comes out of the electrode and the catholyte goes back to lithium sulfate.

In some applications, a method is provided for generating electrical energy by charging and discharging a flow battery system. In some applications, the method comprises circulating a catholyte comprising a sulfate solution through a reaction cell, whereby (a) during system charge the catholyte becomes a persulfate solution, and (b) during system discharge the catholyte goes back to a sulfate solution. In some applications, the catholyte comprises a lithium sulfate solution. In some applications, the system further comprises an amorphous metal electrode, such as amorphous silicon or amorphous tin.

In some applications, the method further comprises providing an anolyte. In some applications, the method comprises circulating the anolyte, which may comprise ferric sulfate, through a reaction cell, the reaction cell comprising a cathode, an anode, and a sulfate ion-exchange membrane; and circulating the catholyte, which may comprise sodium sulfate, through the reaction cell, with the anolyte and catholyte being separated in the reaction cell by the ion exchange membrane, whereby (a) during system charge the anolyte becomes ferrous sulfate and the catholyte becomes sodium persulfate, and (b) during system discharge the anolyte goes back to ferric sulfate and the catholyte goes back to sodium sulfate.

BRIEF DESCRIPTION OF THE FIGURES

The objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF CERTAIN EMBODIMENTS

One embodiment of the invention comprises a long-duration, low-cost energy storage flow battery, wherein two different electrolytes react with each other across an anionic exchange membrane. The anode electrolyte consists of a concentrated non-aqueous solution of ferric/ferrous sulfate, while the cathode electrolyte is an equally concentrated non-aqueous solution of sodium persulfate/sulfate. Such solvents include DMSO, tetraglyme, acetonitrile as well as others. All of these salts are very soluble in polar solvents ($\approx$50-60%), and electrochemically very active, yielding a high discharge potential (ca. 2.781V). A high conductivity sulfate-ion conductive membrane separates the two solutions in the reaction cell (the power component), while the solutions are stored in separate tanks (the energy component). An example of an anionic exchange membrane is the IonFlux™ sold by Saltworks.

Figure 1:
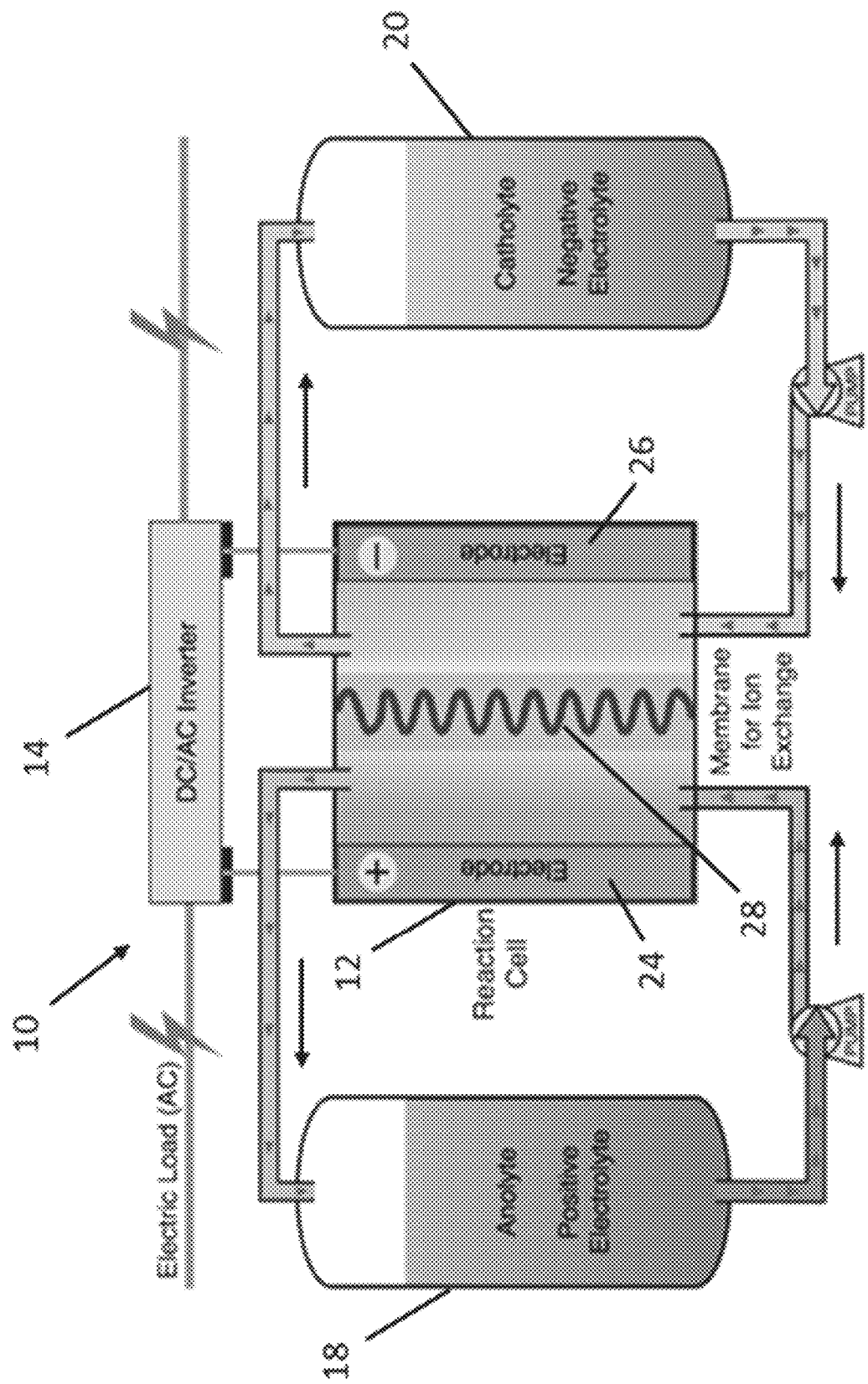
FIG. 1 shows a schematic view of one embodiment of a flow battery.

Referring to FIG. 1, one embodiment 10 of a flow battery comprises at least one reaction cell 12 electrically connected to a DC/AC inverter 14, which itself may be connected to an electric load. The reaction cell 12 is preferably fluidly connected to a reservoir of anolyte (positive electrolyte) 18 and a reservoir of catholyte (negative electrolyte) 20, which may be each circulated through the reaction cell. In one embodiment, the anolyte comprises ferric sulfate, and the catholyte comprises sodium sulfate. Other electrolytes are contemplated as well, including lithium sulfate, ammonium sulfate, and potassium sulfate.

In one embodiment, reaction cell 12 of flow battery 10 comprises at least two electrodes, a cathode 24 and an anode 26, separated by at least one membrane 28 suitable for ion exchange. In one embodiment, the membrane 28 comprises a sulfate ion-exchange membrane. The reaction cell further comprises chambers 30 and 32 for permitting the transmission of electrolyte therethrough. In one embodiment, the membrane 28 is configured to separate the anolyte from the catholyte. In the embodiment wherein the anolyte comprises ferric sulfate, and the catholyte comprises sodium sulfate, the flow battery 10 may be operated such that (a) during system charge the anolyte becomes ferrous sulfate and the catholyte becomes sodium persulfate, and (b) during system discharge the anolyte goes back to ferric sulfate and the catholyte goes back to sodium sulfate, pursuant to the chemistry set forth below.

In one embodiment, the he charge/discharge chemistry is as follows: $S_2O_8^{2-}+2Fe^{++} \leftrightarrow 2Fe^{+++}+2SO_4^{-}$, with a resulting cell voltage of 2.781 V. The complete electrochemical reactions are as follows:

Charging Mode:

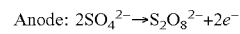
Anode: $2SO_4^{2-} \rightarrow S_2O_8^{2-}+2e^{-}$

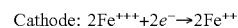
Cathode: $2Fe^{+++}+2e^{-} \rightarrow 2Fe^{++}$

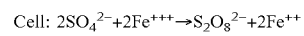
Cell: $2SO_4^{2-}+2Fe^{+++} \rightarrow S_2O_8^{2-}+2Fe^{++}$

Discharge Mode:

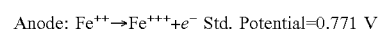
Anode: $Fe^{++} \rightarrow Fe^{+++}+e^{-}$ Std. Potential=0.771 V

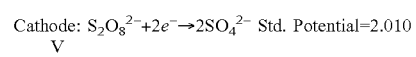
Cathode: $S_2O_8^{2-}+2e^{-} \rightarrow 2SO_4^{2-}$ Std. Potential=2.010 V

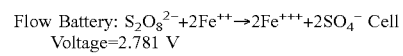
Flow Battery: $S_2O_8^{2-}+2Fe^{++} \rightarrow 2Fe^{+++}+2SO_4^{-}$ Cell Voltage=2.781 V The sodium persulfate (or peroxidisulfate) salt is non-hygroscopic, non-combustible, and can be stored for long time periods ($\approx$10 years) as a salt or concentrated solution. The oxygen in the persulfate (in a peroxide state) can be released easily to assist in oxidation. The higher standard potential of persulfate (2.010V vs. Std.$H_2$) and its strong oxidizing power (intermediate between hydrogen peroxide and ozone, without their inherent stability issues and short half-life) provides one of the highest operating voltages in aqueous and/or non-aqueous systems.

During charging, ferric sulfate is converted to ferrous sulfate at the cathode, and the sodium sulfate to sodium persulfate solution at the anode, both of which are stored as concentrated solutions for energy production during the discharge mode as needed. During discharge, the ferrous sulfate is converted to ferric sulfate at the anode, while the sodium persulfate is converted back to sodium sulfate. The sulfate ion is exchanged between the two solutions across the ion exchange membrane.

Similar flow battery systems can be constructed from other alkali metals, like lithium or potassium, with their corresponding persulfate/sulfate salt solutions, as one electrolyte, and transition metal sulfate solutions as the other electrolyte. A pathway to a higher capacity rechargeable lithium battery can be feasible if the anode and cathode can be de-coupled from each other. A higher capacity lithium anode can be engineered using a flow battery concept for increasing the capacity of the cathode and catholyte to a much higher level. Possible lithium anode materials include amorphous silicon or amorphous tin. These materials, being amorphous, do not undergo crystalline lattice changes and volumetric changes like traditional silicon or tin anodes for lithium absorption. Their amorphous structures, encapsulated in porous materials, can also be useful in preventing dendrite formation during lithium charging/deposition operations. Replacement of the layered oxide cathode, such as lithiated cobalt oxide, by a suitable catalyzed current collector (like porous platinized carbon paper, and the use of oxidative electrolytes like lithium peroxydisulfate (or persulfate) can resolve the cathode capacity limitations. The potential cell voltages are much higher than current Lithium-ion batteries (3.25-3.5 volts), as shown below.

The charge/discharge chemistry is as follows: $S_2O_8^{2-}+2Li \leftrightarrow 2Li^++2SO_4$, with a resulting cell voltage of 5.05 V. The complete electrochemical reactions are as follows:

Charging Mode:

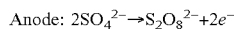

Anode: $2SO_4^{2-} \rightarrow S_2O_8^{2-}+2e^-$

Cathode: $2Li^++2e^- \rightarrow 2Li$

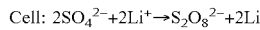

Cell: $2SO_4^{2-}+2Li^+ \rightarrow S_2O_8^{2-}+2Li$

Discharge Mode:

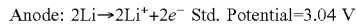

Anode: $2Li \rightarrow 2Li^++2e^-$ Std. Potential=3.04 V

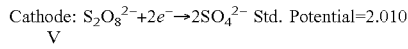

Cathode: $S_2O_8^{2-}+2e^- \rightarrow 2SO_4^{2-}$ Std. Potential=2.010 V

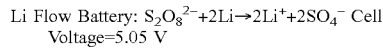

Li Flow Battery: $S_2O_8^{2-}+2Li \rightarrow 2Li^++2SO_4^-$ Cell Voltage=5.05 V Lithium persulfate and lithium sulfate are very soluble in organic solvents and ionic liquids. Suitable non-aqueous solvents with an electrochemical window during charge/discharge in excess of 3.5 volts at each electrode are well known in literature, preventing solvent degradation during cycling operations. What is proposed is a hybrid lithium flow battery, made up of amorphous silicon anodes, preferentially in a porous matrix like carbon aerogels, separated from the lithium salt electrolyte by suitable ion-exchange membranes, preferably cationic exchange membranes which enable lithium ion mobility between the anode and cathode, and a cathode electrode structure which enables the cycling of sulfate and persulfate reactions as shown in the equations above. The hybrid lithium sulfate/persulfate battery capacity is only limited by the amount of lithium stored in the anode structures, since the storage tanks of the flow battery can be sized accordingly, eliminating the current limitation of cathodes of the lithium-ion battery.

Figure 2:
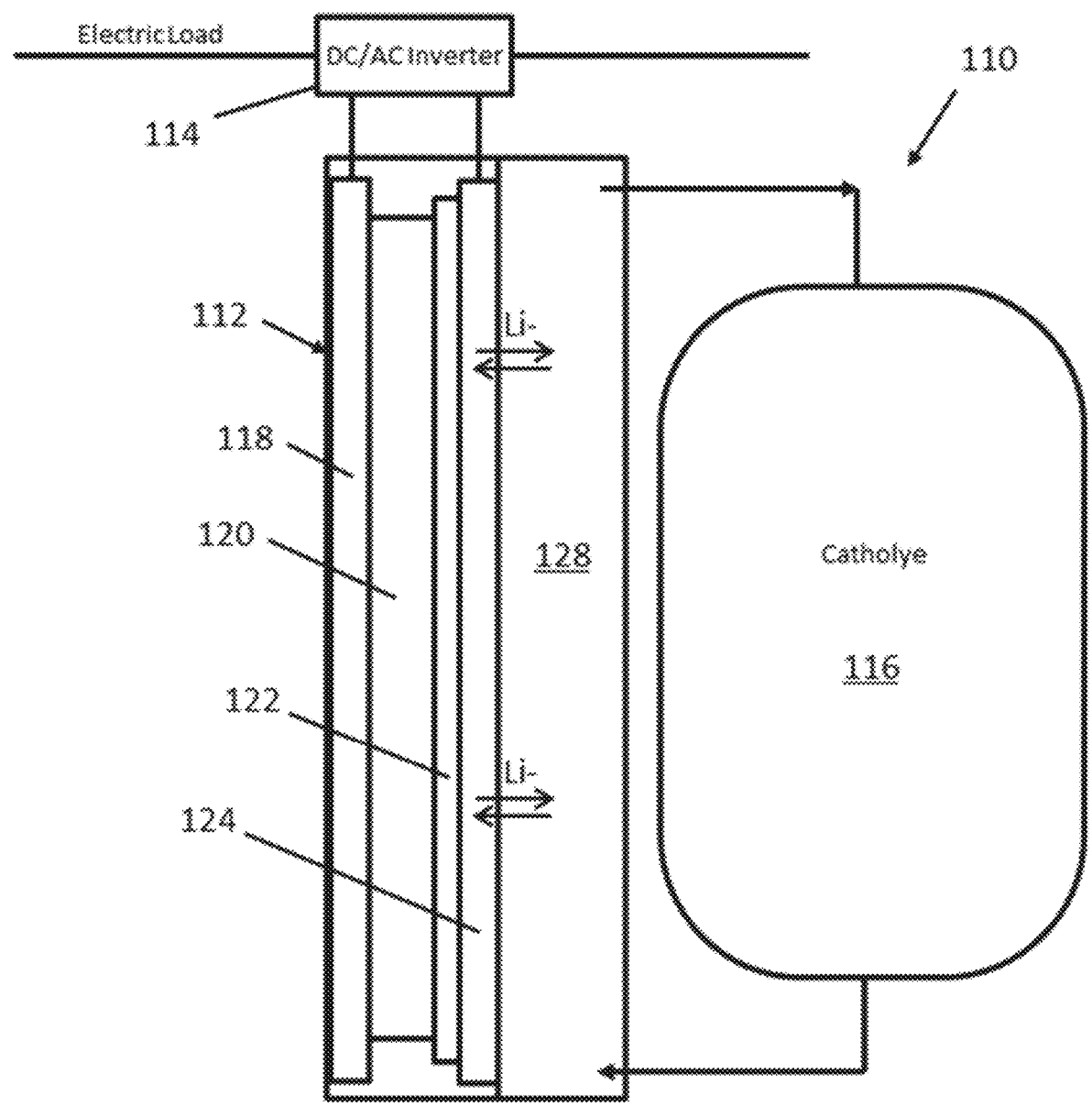
FIG. 2 shows a schematic view of another embodiment of a flow battery.

Referring to FIG. 2, in certain embodiments of a flow battery a hybrid lithium flow battery is provided. In one such embodiment, for example, a hybrid lithium flow battery 110 comprises a battery cell 112 connected electrically to a DC/AC inverter 114 and fluidly connected to a catholyte storage tank 116. In one embodiment, the battery cell 12 comprises an electrode current collector 118, an electrode 120, a separator 122, a porous electrode 124, and a catholyte chamber 128 positioned next to the porous electrode 124. This arrangement, for example, permits the passage of ions from the catholyte chamber through to the electrode 120 by passing through the porous electrode 124 and the separator 122. In one embodiment, the catholyte comprises a sulfate solution, such as lithium sulfate. In one embodiment, the electrode 120 comprises amorphous silicon or amorphous tin. During battery charge, energy is directed from the inverter 114 into the battery cell 112 to cause the ions (e.g., lithium) from the catholyte (e.g., lithium sulfate) from the catholyte chamber 128 to transmit through to the electrode 120 to lithiate the electrode, converting the lithium sulfate to lithium persulfate. During battery discharge, the lithium leaves the electrode 120, now functioning as an anode, and transmits the lithium into the catholyte chamber 128, transforming the lithium persulfate to lithium sulfate.

Similar hybrid flow battery systems can be constructed from other alkali metals besides lithium, such as for example sodium or potassium, with their corresponding persulfate/sulfate salt solutions. In addition, the electrode may be made from any amorphous metal, such as for example, amorphous tin.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A flow battery comprising:
   an electrode, and
   a catholyte comprising a sulfate solution whereby, during charge of the flow battery, the sulfate solution becomes a persulfate solution, and during discharge of the flow battery, the persulfate solution becomes a sulfate solution.

2. The flow battery of claim 1, wherein the electrode comprises an anolyte.

3. The flow battery of claim 2, wherein the anolyte comprises ferric sulfate.

4. The flow battery of claim 3, wherein the catholyte comprises sodium sulfate.

5. The flow battery of claim 4, further comprising a sulfate ion-exchange membrane separating the anolyte from the catholyte, whereby (a) during system charge the anolyte becomes ferric sulfate and the catholyte becomes sodium persulfate, and (b) during system discharge the anolyte goes back to ferric sulfate and the catholyte goes back to sodium sulfate.

6. The flow battery of claim 1, wherein the electrode comprises amorphous metal.

7. The flow battery of claim 6, wherein the electrode comprises amorphous silicon.

8. The flow battery of claim 6, wherein the catholyte comprises lithium sulfate, whereby (a) during system charge the catholyte becomes lithium persulfate and lithium is deposited within the electrode, and (b) during system discharge the lithium comes out of the electrode and the catholyte goes back to lithium sulfate.

9. A method for generating electrical energy by charging and discharging a flow battery system, the method comprising circulating a catholyte comprising a sulfate solution through a reaction cell, whereby (a) during system charge the catholyte becomes a persulfate solution, and (b) during system discharge the catholyte goes back to a sulfate solution.

10. The method of claim 9, wherein the catholyte comprises a lithium sulfate solution.

11. The method of claim 10, wherein the system further comprises an amorphous metal electrode.

12. The method of claim 11, wherein the electrode comprises amorphous silicon.

13. The method of claim 9, wherein the system further comprises an anolyte.

14. The method of claim 13, comprising:
 circulating the anolyte comprising ferric sulfate through a reaction cell, the reaction cell comprising a cathode, an anode, and a sulfate ion-exchange membrane; and
 circulating the catholyte comprising sodium sulfate through the reaction cell, the anolyte and catholyte separated in the reaction cell by the ion exchange membrane,
 whereby (a) during system charge the anolyte becomes ferrous sulfate and the catholyte becomes sodium persulfate, and (b) during system discharge the anolyte goes back to ferric sulfate and the catholyte goes back to sodium sulfate.

\* \* \* \* \*